Jan. 13, 1970    K. D. FOLKERTS ET AL    3,489,311
TANKS FOR STORAGE OF LIQUEFIED GAS
Filed May 25, 1967
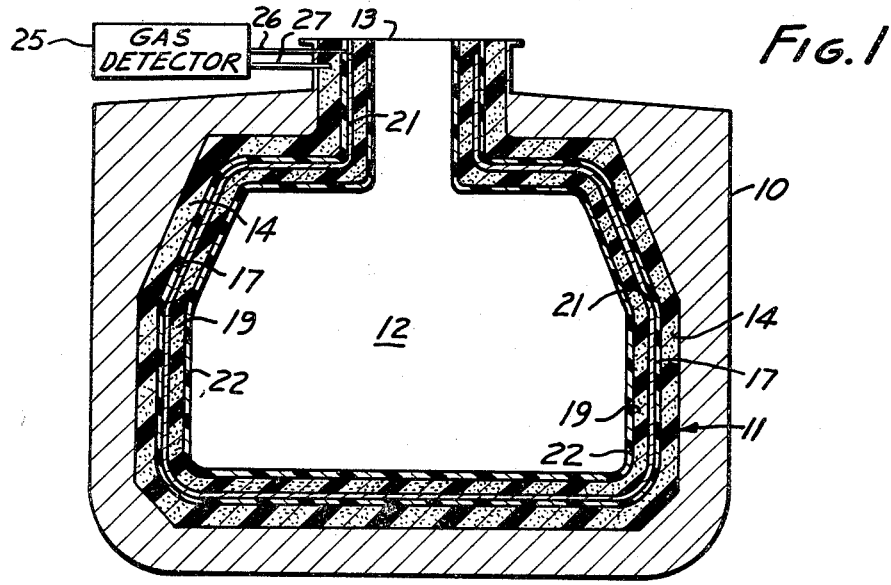
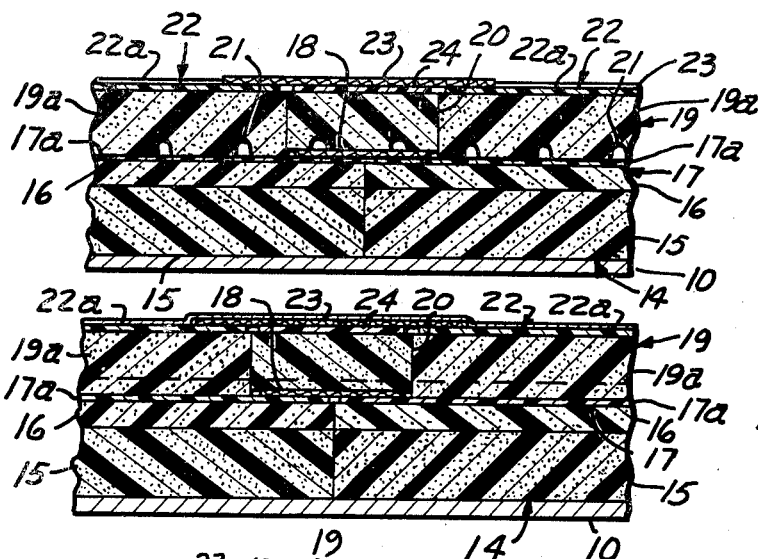
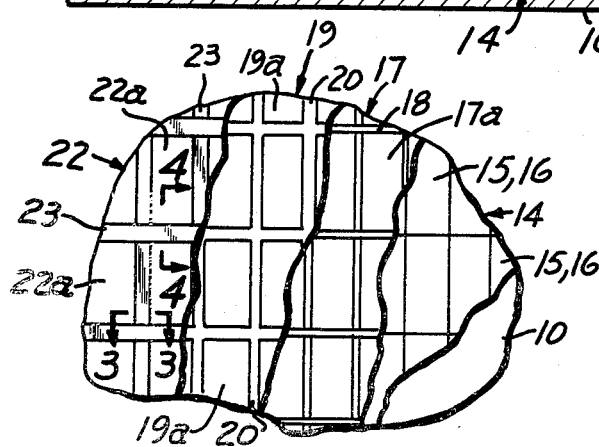
INVENTORS;
KEITH D. FOLKERTS,
DANIEL BURGOA,
JAIME TORROJA
BY
ATTORNEYS.

United States Patent Office 3,489,311
Patented Jan. 13, 1970

3,489,311
TANKS FOR STORAGE OF LIQUEFIED GAS
Keith D. Folkerts, Covina, Calif., and Daniel Burgoa and Jaime Torroja, Bilbao, Spain, assignors to Aerojet-General Corporation, El Monte, Calif., a corporation of Ohio
Filed May 25, 1967, Ser. No. 641,380
Int. Cl. B65d 25/14, 11/16; G01m 3/04
U.S. Cl. 220—9
14 Claims

ABSTRACT OF THE DISCLOSURE

According to the present disclosure, a tank for containing fluid comprises a plurality of preformed blocks for forming barriers and insulation layers. Each block includes a primary barrier panel, a primary insulation panel, a secondary barrier panel, and a secondary insulation panel, in that order. The blocks are sealed together in situs to form the primary and secondary barrier and insulation layers. The secondary barrier and insulation panels are so sized as to permit access past adjacent primary barrier and insulation panels to permit sealing of the secondary barrier panels in situs. Preferably, the secondary insulation panels are sealed to the wall of the supporting structure. Detection means may be provided for detecting leaks in either the primary or secondary barrier layers.

---

This invention relates to tanks for transportation or storage of liquefied gas, and particularly to tanks suitable for transporting or storing liquefied gases at pressures near atmospheric pressure and at temperatures below ambient temperature.

Heretofore, tanks have been proposed for transporting cold liquefied gases which transmit to the hull of the ship supporting it hydrostatic and hydrodynamic forces and sustain thermal stresses. These tanks have been made of either a welded assembly of corrugated metal plates or of flat plates connected together by means of flexible metal bellows elements. However, the thermal expansions or contractions are not fully compensated for at all points with such tanks. Further, former tanks, constructed from metal, required right-angle joints because the corrugations of the metal did not provide a fluid seal at other angles. Thus, former tanks were limited in design to a rectangular section. Moreover, former tanks had locations where high thermal stresses occurred and other locations of low thermal stresses.

The installation and repair of previously known tanks usually involves long and expensive operations which often necessitate the removal and sometimes even the destruction of certain parts. The fabrication of such tanks is an operation which cannot be carried out independently of the construction of the ship, and prolongs the period that the ship would be in drydock.

It is an object of the present invention to provide a tank which may be fabricated in a minimum period of time and independently of the construction of the supporting vessel.

Another object of the present invention is to provide a tank which uniformly supports thermal stresses.

Another object of the present invention is to provide a tank which may be fabricated in any design and is not limited to right-angle joints.

According to the present invention, a device is provided for the containment of fluid, the device comprising a plurality of blocks for forming barrier and insulation layers. Each block includes a primary barrier panel and a primary insulation panel. Sealing means is provided to seal junctions between adjacent primary barrier panels.

According to an optional but desirable feature of the present invention, a secondary barrier panel is provided adjacent the primary insulation panel and is so sized as to permit access past adjacent primarybarrier and insulation panels. Sealing means is provided to seal the junction between adjacent secondary barrier panels.

According to another optional but desirable feature of the present invention, a secondary insulation panel is sealed to the secondary barrier panel and to a supporting structural wall.

According to another preferred but optional feature of the present invention, detection means is provided for detecting leaks in either the primary or secondary barrier layers.

The above and other features will be more fully understood from the following detailed description and the accompanying drawings, in which:

FIG. 1 is a side view in cutaway cross-section illustrating a tank according to the present invention, installed within a vessel which may be a ship's hull;

FIG. 2 is a view looking at a portion of the inside wall surface of the tank of FIG. 1 and with layers of the wall shown cut away for purposes of illustration of the wall construction;

FIG. 3 is an enlarged side view elevation in cutaway cross-section of the wall taken along line 3—3 in FIG. 2; and FIG. 4 is an enlarged side view elevation in cutaway cross-section of the wall taken along line 4—4 in FIG. 2.

In FIG. 1 there is illustrated a vessel which may be any suitable container and which in the present specification is assumed to be a ship's hull 10. As shown in the drawings, the design of the inner shell of hull 10 may be an irregular shape, and is not required to be rectangular, as was required with former tanks. Thus, where the vessel is a ship, the inner shell may be of any optimum design for the ship, and center bulkheads, required for ships with rectangular inner shells, may be eliminated. Tank 11, constructed in accordance with the present invention, is confined within the inner shell and conforms to the shape of the inner shell. The tank forms a chamber 12 for containment of liquefied gas, and an orifice 13 is adapted to be closed by a suitable hatch (not shown).

Referring particularly to FIGS. 2, 3 and 4, the construction of tank 11 is illustrated in detail. The tank walls include a layer of insulation 14 (sometimes hereinafter referred to as the "secondary insulation layer"), positioned adjacent the inner shell of the ship's hull 10. The secondary insulation layer comprises a plurality of substantially rectangular shaped panels 15 constructed from closed-cell insulating foamed plastic and a plurality of panels 16 of open-celled foamed plastic positioned over insulation panels 15 so as to provide a fluid-saturable layer of insulation. Alternatively, insulation layer 14 may comprise a single layer of panels of foamed plastic having open channels to permit flow of fluid for purposes to be hereinafter explained.

A barrier layer 17 (sometimes hereinafter referred to as a "secondary barrier layer") comprising plastic panels 17a, is positioned over the secondary insulation layer. Panels 17a are sealed together with tape 18. Over panels 17a is placed an insulation layer 19 (sometimes hereinafter referred to as "primary insulation layer") comprising insulation panels 19a constructed from insulating plastic. A filler strip 20, also constructed from insulating plastic, is positioned between adjacent insulation panels 19a over the region of tape 18. Each insulation panel 19a and each filler strip 20 contains one or more open channels 21 which extend throughout the entire tank wall for purposes to be hereinafter explained. Alternately, a porous layer of open-celled foamed plastic may be used for insulation panels 19a.

In contact with insulation panels 19a are barrier panels 22a which are sealed together with tapes 23 to form barrier layer 22 (sometimes hereinafter referred to as "primary barrier layer"). A layer of plastic panels 24 is preferably positioned over the filler strips 20 to further enhance the primary barrier layer and to fill the void between the filler strip and tape 23.

The barrier panels are preferably constructed of flexible nonmetallic material and are bonded to the adjacent insulation panels. Alternatively, the panels may be cast together in a single operation. By way of example, the barrier panels may be constructed from a polyester film such as Mylar or Tedlar, or other equivalent plastic material which is not subject to deterioration by liquids in the tank or insulation layers. As one example of a barrier panel, several layers of thin sheets of plastic barrier material may be adhesively bonded together to form a laminated barrier panel. Aluminum foil or other low-emissivity material may be incorporated into the laminated panel to provide reduced heat transmission and permeability. Glass filaments, or polyester fibers such as Dacron fibers, may be incorporated into the barrier panels to improve the strength and thermal expansion properties of the barrier layer. Such filaments or fibers are preferably woven into a flexible cloth-like mat and form a layer of the laminated barrier panel. The bonding agent used for bonding together the sheets of barrier material to form the barrier panels may be any suitable adhesive.

The barrier panels are sealed with tape 18 or 23 which is preferably formed from the same material forming the barrier panels, such as a polyester film or other equivalent plastic. The tape is preferably precoated with an adhesive bonding agent such as a heatcurable polyester resin. Alternatively, the adhesive may be applied when applying the tape.

The insulation panels 15 and 19a are preferably formed from suitable closed-cell foamed plastic, the structure of which contains interstices capable of containing gas. Gas is permitted to pass through the cellular walls of the foamed plastic by a diffusion process. Examples of such foamed plastic are polyurethane foam, cellulose acetate, urea formaldehyde, polystyrene foam, styrene acrylonitrile, silicon foam, polyvinyl chloride foam, and polyethylene foam. Insulation panel 16, if used, is constructed from a suitable open cell plastic foam. It is preferred that the foamed plastic has similar thermal expansion properties as the barrier panels so as to reduce shear stresses between the barrier and insulation panels.

The barrier panels are bonded to the insulation panels, and the secondary insulation panel is bonded to the inner shell of the vessel with a suitable bonding agent such as an epoxy or polyurethane resin.

As shown in FIGS. 2-4, the panels forming the secondary insulation layer have the largest length and width dimensions, the panels forming the secondary barrier layer having the same or slightly smaller length and width dimensions as the secondary insulation panels. The panels forming the primary insulation layer have smaller length and width dimensions than the secondary barrier panels, and the panels forming the primary barrier layer have length and width dimensions the same as or slightly smaller than the primary insulation panels. The relative sizing of the various panels permits the construction of preformed blocks which may later be sealed together in situ.

A secondary insulation panel 15 is sealed to an optional secondary porous insulation panel 16 with an adhesive bonding agent. A panel 17a of the secondary barrier layer is adhesively bonded to the bonded insulation panel so that the barrier panel substantially covers the secondary insulation panel. A panel 19a of the primary insulation layer is bonded to the secondary barrier panel leaving a portion of the face of the secondary barrier layer panel exposed adjacent the peripheral edges of the secondary barrier panel. A primary barrier panel 22a is bonded to the primary insulation panel, substantially covering the same.

The completed blocks thus comprise panels of secondary insulation, secondary barrier, primary insulation and primary barrier, one side of the primary barrier panel being exposed and a portion of the secondary barrier panel being exposed.

The use of prefabricated blocks of primary and secondary barrier and insulation panels permits installation of the tank in a minimum period of time. The preformed blocks are placed adjacent to each other and against the inner shell of the vessel and the secondary insulation panels 15 are bonded to the inner shell. Preferably, the adjacent insulation panels are bonded together. The panels 17a forming the secondary barrier are then sealed together with tape 18. The tape is preferably formed from the same plastic material used for the construction of the barrier layers and is pre-coated with an adhesive bonding agent. After tape 18 is bonded to the secondary barrier panels, thereby sealing the secondary barrier, the space between the adjacent primary insulation panels over tape 18 is filled with filler strips 20 which are bonded with an adhesive bonding agent to tape 18 and preferably to adjacent insulation panels 19a. Strips 20 preferably include a layer of barrier material 24 pre-bonded to the exposed side to form part of primary barrier layer 22. The panels 22a forming the primary barrier layer are then sealed together with tape 23.

A suitable inert gas is circulated within passages 21 in the primary insulation layer. A second, different inert gas is contained under pressure between the inner shell 10 and the secondary barrier layer 17, within the interstices of the secondary insulation layer 14. The secondary inert gas is maintained at a higher pressure than the primary inert gas. Suitable primary and secondary insulation inert gases are, for example, nitrogen ($N_2$) and carbon dioxide ($CO_2$), or nitrous oxide ($N_2O$), respectively. Gas detection equipment 25 is connected via conduit 26 to passages 21 and via conduit 27 to the secondary insulation layer. Conduit 27 is in fluid communication with the interstices of secondary insulation layer 14, and passages 21 are in fluid communication with the interstices of primary insulation layer 19.

Gas detection system 25 includes detectors capable of detecting the presence of stored gas in the primary insulation inert gas. The gas detector further includes detectors capable of detecting the presence of secondary inert gas in the primary inert gas. Additionally, detectors may be provided to detect the presence of stored gas in the secondary insulation inert gas. A blower may be provided for circulating the primary insulation inert gas through passages 21, and suitable alarm and indicating devices are responsive to the gas detectors to indicate leaks in the barrier layers. The gas detector samples gas through each of conduits 26 and 27 to detect the presence of stored gas mixed with either the primary inert gas or the secondary inert gas. The gas detector further samples the primary inert gas for the presence of secondary inert gas. By way of example, suitable gas detectors include platinum wire type gas detectors, infrared detectors, and gas chromatographs.

Should a leak occur in the primary barrier, gas contained in chamber 12 of the tank, for example methane, will mix with the inert gas circulating in passages 21. Gas detector 25 is adapted to detect the presence of stored gas, such as methan, in the inert gas, and actuate suitable alarm devices. Should a leak occur in only the secondary barrier, the inert gas under pressure in the secondary insulation layer will pass into passages 21. The presence of the leak in the secondary barrier layer can be detected by sampling gas through conduit 26 and detection of secondary insulation gas by gas detector 25.

If leaks occur in both the primary and secondary barriers, samples of gas through conduit 26 will indicate the presence of both stored gas and secondary insulation gas. Also, samples of gas through conduit 27 will indicate the presence of stored gas in the secondary insulation gas.

The insulation layers may be divided into zones and each zone may be sampled separately. By sampling the primary and secondary inert gases in each zone for the presence of detectable gas, the failure of a barrier layer may be localized to a particular zone.

In use, the tank is sufficiently flexible as to compensate for dimensional variations of the supporting structure, such as the inner shell of the hull of a ship. Thus, even though the vessel may be subjected to severe periodic rolling, pitching or heaving, such as may be encountered in rough seas or during storms, the dimensions of the tank vary with the hull and transmit to the hull hydrostatic hydrodynamic stresses. Thermal expansions and contractions are fully compensated for by properly matching the thermal expansion and mechanical properties of the plastics and adhesives.

The present invention thus provides a tank for the storage and transportation of liquefied gas. The tank is highly flexible and is capable of sustaining thermal stresses. The tank comprises prefabricated blocks which may be installed within a vessel, such as a ship, in a minimum period of time.

What is claimed is:

1. In a vessel having a supporting wall, a container comprising: a plurality of first blocks fixedly secured to said wall in edge-to-edge relation, each of said first blocks having a secondary thermal insulation panel fixedly secured to said wall, a fluid impervious secondary barrier panel fixedly secured to said secondary insulation panel, a primary thermal insulation panel fixely secured to said secondary barrier panel, and a fluid impervious primary barrier panel fixedly secured to said primary insulation panel, the secondary barrier panels and the secondary insulation panels being sufficiently larger than the primary barrier panels and the primary insulation panels as to permit access past adjacent primary barrier panels and primary insulation panels to a junction between adjacent secondary barrier panels of adjacent first blocks; a plurality of second blocks each having a primary thermal insulation panel and a fluid impervious primary barrier panel fixedly secured to the primary insulation panel, each of said second blocks being disposed in the region between primary barrier panels and primary insulation panels of adjacent first blocks; first fluid impervious sealing means sealing adjacent primary barrier panels of adjacent ones of said first and second blocks; and second fluid impervious sealing means sealing adjacent secondary barrier panels of adjacent ones of said plurality of first blocks, whereby the primary barrier panels together with the first sealing means form a fluid impervious primary barrier layer for said container adapted to contact and hold fluid, and the secondary barrier panels together with the secondary sealing means form a fluid inpervious secondary barrier layer, the primary insulation panels together form a primary thermal insulation layer between the primary and secondary barrier layers, and the secondary insulation panels together form a secondary thermal insulation layer between the secondary barrier layer and the wall.

2. The combination according to claim 1 wherein the secondary insulation panel is bonded to said supporting wall with an adhesive bonding agent.

3. The combination according to claim 1 wherein said first and second sealing means are plastic tapes adhesively bonded to the respective panels.

4. The combination according to claim 1 wherein each of said barrier panels is constructed from flexible plastic and each of said insulation panels is constructed from foamed plastic.

5. The combination according to claim 4 wherein the secondary insulation panel is bonded to said supporting wall with an adhesive bonding agent.

6. The combination according to claim 5 wherein said first and second sealing means are plastic tapes adhesively bonded to the respective panels.

7. The combination according to claim 1 further including detection means for detecting leaks in said primary barrier layer.

8. The combination according to claim 7 wherein said detection means comprises a first inert fluid confined within said primary insulation layer, and detector means connected to said primary insulation layer for detecting the presence of a different fluid contained in the container in the first inert fluid.

9. The combination according to claim 8 wherein said detection means further detects leaks in the secondary barrier layer, said detection means further including a second inert fluid confined within said secondary insulation layer, said detector means being connected to said secondary insulation layer for detecting the presence of a different fluid contained in the container in the second inert fluid.

10. The combination according to claim 9 wherein one of said inert fluids is at a higher pressure than the other inert fluid, and said detector means is connected to detect the presence of one inert fluid in the other inert fluid, whereby leaks in said secondary barrier layer may be detected independently of leaks in the primary barrier layer.

11. A barrier an insulation block for forming primary and secondary fluid impervious barrier and thermal insulation layers of a container for containing fluid, said block comprising: a secondary thermal insulation panel adapted to be secured to a wall of a supporting structure; a fluid impervious secondary barrier panel fixedly secured to said secondary insulation panel; a primary thermal insulation panel fixedly secured to said secondary barrier panel; and a fluid impervious primary barrier panel fixedly secured to said primary insulation panel, said block being adapted to be placed in edge-to-edge relation to other similar blocks so that the primary barrier panels together form a fluid impervious primary barrier layer, the primary insulation panels together form a primary thermal insulation layer, the secondary barrier panels together form a fluid impervious secondary barrier layer, and the secondary insulation panels together form a secondary thermal insulation layer, the secondary barrier panels and the secondary insulation panels being sufficiently larger than the primary barrier panels and the primary insulation panels as to permit access past adjacent primary barrier panels and primary insualtion panels to a junction between adjacent secondary barrier panels of adjacent blocks so as to permit sealing of said junction between adjacent secondary barrier panels.

12. A barrier and insulation block according to claim 11 wherein the primary insulation panel is bonded to the primary and secondary barrier panels with an adhesive bonding agent.

13. A barrier and insulation block according to claim 11 wherein each of said barrier panels is constructed from flexible plastic and each of said insulation panels is constructed from foamed plastic.

14. A barrier and insulation block according to claim 13 wherein the primary insulation panel is bonded to the primary and secondary barrier panels and the secondary insulation panel is attached to the secondary barrier panel with an adhesive bonding agent.

References Cited

UNITED STATES PATENTS

| | | | |
|---|---|---|---|
| 2,983,401 | 5/1961 | Murphy | 220—9 |
| 3,039,418 | 6/1962 | Versluis | 220—9 |
| 3,079,026 | 2/1963 | Dosker | 220—9 |
| 3,106,307 | 10/1963 | Morrison | 220—9 |
| 3,115,982 | 12/1963 | Morrison | 220—9 X |
| 3,225,955 | 12/1965 | Farkas et al. | 220—9 |
| 3,261,087 | 7/1966 | Schlumberger | 220—9 X |
| 3,339,780 | 9/1967 | Forman et al. | 220—9 |
| 3,341,049 | 9/1967 | Forman et al. | 220—9 |
| 3,341,050 | 9/1967 | Forman et al. | 220—9 |
| 3,224,624 | 12/1965 | French | 220—15 |
| 3,272,373 | 9/1966 | Alleaume et al. | 114—74 |

FOREIGN PATENTS 1,005,500  9/1965  Great Britain.

GEORGE E. LOWRANCE, Primary Examiner

J. R. GARRETT, Assistant Examiner

U.S. Cl. X.R.

73—40.7, 49.2